Jan. 28, 1964  N. F. GILSON  3,119,466
WHEEL BLOCKING DEVICE
Filed Oct. 24, 1960

*INVENTOR.*
NORMAN F. GILSON
BY M. Ralph Shaffer
HIS ATTORNEY 3,119,466
WHEEL BLOCKING DEVICE
Norman F. Gilson, 751 E. 4500 South,
Salt Lake City, Utah
Filed Oct. 24, 1960, Ser. No. 64,619
1 Claim. (Cl. 188—32)

This invention relates to devices which are used for blocking a wheel of an automobile or truck preparatory to lifting the opposite wheel with the aid of a suitable jack and, more particularly, to a new and improved device of the type described which is easily manipulated and is highly reliable.

In the past many types of wheel blocking devices have been conceived in one form or another. Those of which the applicant is aware have proven unsatisfactory because of time consuming manipulation, unreliability or inherent structural weakness.

Accordingly, an object of the present invention is to provide a new and improved wheel blocking device which will be extremely inexpensive to manufacture and yet highly reliable.

A further object is to provide a wheel blocking device of a double chock block and slide bar construction wherein, by virtue of the construction of the slide bar, the longitudinal slot thereof may be of unrestricted length without imparting structural weakness to the overall device.

A further object is to provide a doubled chock block, slide bar type wheel blocking device wherein one or both of the chock blocks may be extremely easily adjusted in block spacing.

An additional object is to provide a device of the type described wherein the chock block pair are themselves supplied with road gripping, transverse teeth, preferably of a particular orientation as hereinafter described, so as to prevent slippage of the device on icy roads, for example.

According to the present invention and in a preferred embodiment thereof the device employs a pair of hollow chock blocks with an elongate slide bar. All three of these parts are preferably cast, with the blocks themselves being of hollow construction and yet designed for rigidity, and the slide bar being slotted and medially relieved thereabout so as to reduce material cost without sacrificing bar strength. The chock blocks are supplied with threaded stud and nut combinations which clamp the slide bar to the chock block so as to prevent the inadvertent block movement with respect to the slide bar upon the application of wheel pressure. The studs may be cast into the chock blocks and exterior, round, knurled hand nuts supplied, or the nut and stud combination may be unitary and threaded into the chock blocks, as desired.

The blocks are preferably supplied with flanges which overlap the bar and also a guide proturberance disposed within the bar slot. These, used alternatively or in combination, will aid the operator in manipulating the device by merely loosening the stud means and urging the appropriate chock block either to the right or to the left.

Both of the chock blocks preferably have transverse, road gripping teeth to prevent slippage. These teeth are preferably disposed in a particular relationship with respect to the angulated faces of the block.

The features of the present invention which are believed to be novel are set forth with particularity in the appended claim. The present invention, both as to its organization and manner of operation, together with further objects and advantages thereof, may best be understood by reference to the following description, taken in connection with the accompanying drawings in which:

Figure 1:
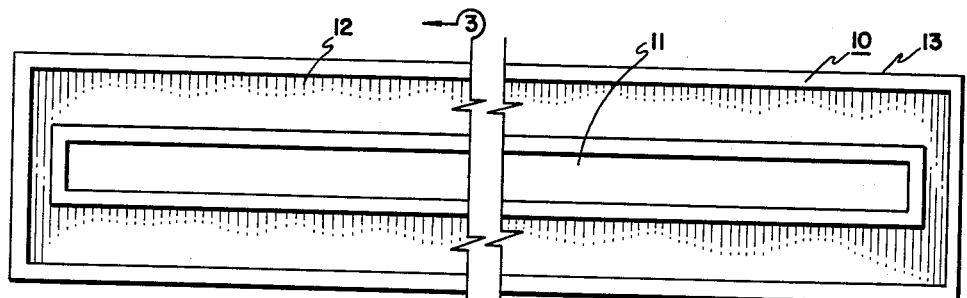
FIGURE 1 is a side elevation of the slide bar of the invention, shown cut away for conservation of space.
Figure 2:
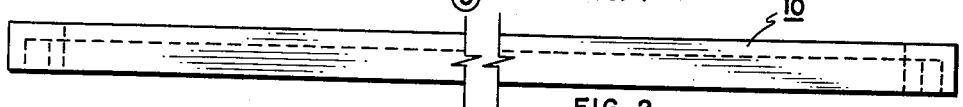
FIGURE 2 is a plan view of the slide bar of FIGURE 1.
Figure 3:
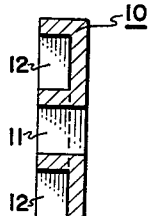
FIGURE 3 is a vertical section taken along the line 3—3 in FIGURE 1.

In FIGURE 1 the slide bar 10 is shown to comprise an elongate bar having a longitudinal slot 11. By virtue of the construction of the slide bar, the slot 11 is substantially unrestricted in length, so long as there exists some margin of material at the ends thereof. For strength it is deemed desirable to have slide bar 10 a cast part of from one-half to one inch in thickness and, for reduction of material and cost, that there exist a medial, annular indentation 12 disposed about slot 11. In being medial with respect to the slot 11 and the periphery 13 of the part, the recessed area 12 constitutes a great saving in fabrication cost without sacrificing strength which is given to the part by the double-C configuration thereof as illustrated in FIGURE 3.

Figure 6:
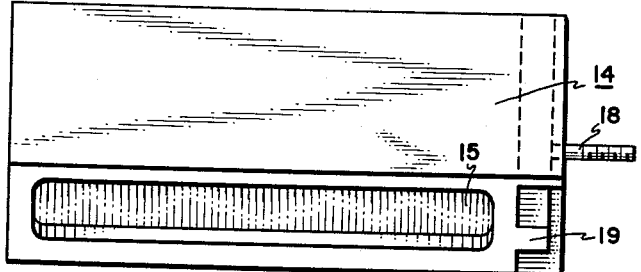
FIGURE 6 is a top plan of the chock block of FIGURES 4 and 5.
Figure 4:
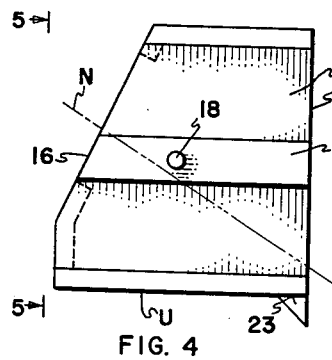
FIGURE 4 is a side elevation of a representative chock block employed. (It is understood that the chock blocks will be of "right and left" construction.)
Figure 5:
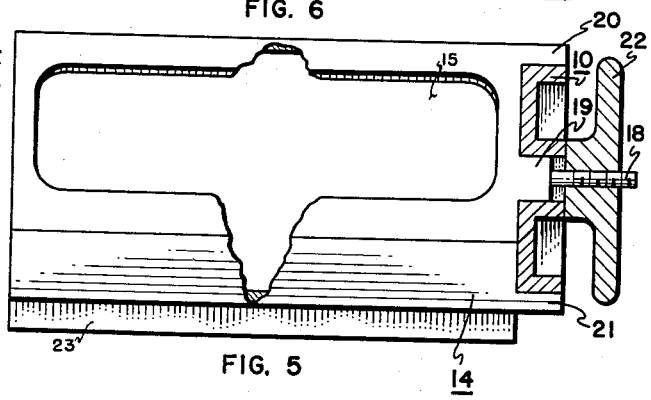
FIGURE 5 is a view taken along the line 5—5 in FIGURE 4 with the hand nut and slide bar being indicated in vertical section.

FIGURES 4, 5 and 6 illustrate a representative chock block of the device. Chock block 14 is also preferably cast and, for reduction of the material used, may be made hollow, including lightening aperture 15 through the angulated contact surface 16 thereof so as to save manufacturing expense. The rearward face 17 of the block will be completely open and the block itself hollow. Of importance in the construction of the block is a threaded stud 18 which may be affixed to the chock block during the casting process. Also preferably included is the horizontal, elongate, guide protuberance 19 which, as will be seen, will ride in the slot 11 of slide bar 10. Permissibly included are also the flange protuberances 20 (the upper flange) and 21 (the lower flange) which, as will be seen, overlap the slide bar. The guide protuberance 19 of each of the chock blocks employed preferably should not be wider than the width of slot 11 of the slide bar 10 and should be a fraction of an inch less than this so as to enable the tightening up of the hand nuts cooperating therewith (hereinafter to be described). At least this should be the case where the guide protuberance area is near the stud area. It will of course be understood that fixed or integral stud and nut combinations may be used and threaded into the two cast chock blocks if desired.

Figure 7:
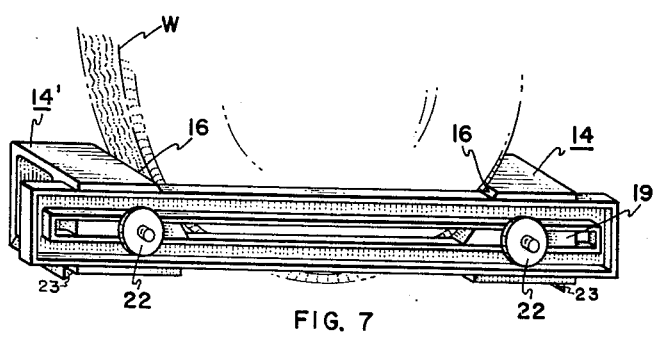
FIGURE 7 is a perspective view of the completed device and indicates its manner of cooperation with a wheel to be blocked.

FIGURE 7 illustrates the assembly of the chock blocks and slide bar for the completed device. The wheel is shown in phantom line at W between two blocks 14 and 14'. (Block 14' is identical to block 14 excepting that it is mutually, oppositely facing as shown.) The surface 16 of both of the blocks will contact the periphery of the wheel tire. One of the blocks may be fixed by any conventional means to the slide bar if desired. For versatility and for space saving, however, it is deemed preferable if both of the chock blocks are slideably mounted to slide bar 10.

As is seen in FIGURE 7 the chock blocks 14 and 14' are mounted to slide bar 10 by means of nuts 22. These nuts preferably should be round, knurled hand nuts which are threaded onto the studs 18 of the chock blocks 14 and 14'. The tightening down of nuts 22 actually clamps the slide bar to the chock blocks, and the unturning of the nuts will allow the chock blocks to be moved relative to one another. Strength of the slide bar is preserved by virtue of the recessed cast design thereof.

Of importance is the fact that each of the chock blocks includes a transverse, elongate tooth 23 which is used for gripping into the road should wheel pressure be applied thereto. The tooth will be disposed rearwardly on the undersurface U of each chock block so that the surface normal N (see FIGURE 4) may in its extension approach from the area where the tooth 23 is disposed, at least substantially so. Thus, wheel pressure directed normally to surface 16 will be transmitted to the tooth 23 so as to cause the latter to bite into the road. This helps prevent slippage of the device. It will be seen with reference to FIGURES 5 and 7 that the flanges 20 and 21 overlap the edges of slide bar 10. This is believed desirable, in cooperating either with or without guide protuberance 19, in enabling the easy adjustment of one chock block with respect to another. Thus, the nut 22 need only be loosened and that chock block advanced toward the other as desired.

Preferably the slide bar 10 is removed from ground level by virtue of the design of the chock blocks 14 and 14' so as to prevent excessive strength from being opposed thereon and, further, to make the teeth 23 effective. It will be observed that the road gripping teeth 23 of the blocks 14 and 14' are very effective, much more so than were the teeth applied to the slide bar 10, since the teeth of the present instance will be directly in line with wheel pressure.

Accordingly, it will be seen that a novel wheel blocking device has been provided by this invention and that the same is much more versatile, less costly, and more reliable than other devices heretofore used.

While particular embodiments of the present invention have been shown and described, it will be obvious to those skilled in the art that changes and modifications may be made without departing from this invention in its broader aspects, and, therefore, the aim in the appended claim is to cover all such changes and modifications as fall within the true spirit and scope of this invention.

I claim:

A wheel blocking device including, in combination, a slide bar having a longitudinal slot, a first chock block secured to said slide bar, a second chock block, and means disposed through said slot, engaging said second chock block and releasably clamping said slide bar to said second chock block for frictionally affixing said second chock block to said slide bar a selected distance from said first chock block, and wherein said second chock block is provided with an elongate, guide protuberance slideably disposed in said slot, and engaging said frictionally affixing means.

References Cited in the file of this patent

UNITED STATES PATENTS

| | | |
|---|---|---|
| 1,238,680 | Johnson | Aug. 28, 1917 |
| 2,773,564 | Garard | Dec. 11, 1956 |
| 2,848,070 | Wilson | Aug. 19, 1958 |

FOREIGN PATENTS

| | | |
|---|---|---|
| 313,311 | Germany | July 1, 1919 |
| 654,248 | France | Nov. 28, 1928 |